United States Patent
Brotto

(12)
(10) Patent No.: US 6,362,596 B1
(45) Date of Patent: Mar. 26, 2002

(54) METHOD FOR VARYING SAMPLING INTERVAL LENGTH

(75) Inventor: Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/696,874

(22) Filed: Oct. 26, 2000

Related U.S. Application Data

(63) Continuation of application No. 09/292,164, filed on Apr. 15, 1999, now Pat. No. 6,175,211.
(60) Provisional application No. 60/090,427, filed on Jun. 17, 1998.

(51) Int. Cl.[7] .......................... H01M 10/44; H01M 10/46
(52) U.S. Cl. .......................... 320/106; 320/132; 320/155
(58) Field of Search ................................. 320/106, 110, 320/132, 127, 135, 155, 157

(56) References Cited

U.S. PATENT DOCUMENTS

| | | |
|---|---|---|
| 5,237,257 A | 8/1993 | Johnson et al. |
| 5,332,957 A | 7/1994 | Lee |
| 5,696,435 A | 12/1997 | Koenck |
| 5,744,937 A | 4/1998 | Cheon |
| 5,767,659 A | 6/1998 | Farley |
| 5,850,134 A | 12/1998 | Oh et al. |

OTHER PUBLICATIONS

Partial European Search Report, dated Jan. 29, 2001.

*Primary Examiner*—Edward H. Tso
(74) *Attorney, Agent, or Firm*—Adan Ayala

(57) ABSTRACT

A method for charging a rechargeable battery pack includes identifying battery capacity, determining sampling interval length according to the battery capacity, and implementing the determined sampling interval length. Also disclosed herein is a method for charging batteries comprising identifying battery capacity, determining current-on period length in duty cycle according to the battery capacity, and implementing the determined current-on period length. Further, disclosed herein is a battery charging apparatus comprising a charger for charging first and second batteries, where the first battery comprises a microprocessor. The charger further comprises at least one terminal for receiving a battery identification signal, so that the charger can distinguish between the first and second batteries. Also disclosed herein is a battery/charger combination comprising a battery comprising first, second and third terminals, at least one cell disposed between the first and second terminals and a microprocessor disposed within the battery between the first and third terminals, a charger connected to the battery via the first, second and third terminals, wherein the microprocessor controls charging of the battery by sending instructions to the charger.

22 Claims, 3 Drawing Sheets

METHOD FOR VARYING SAMPLING INTERVAL LENGTH

CROSS-REFERENCE TO RELATED APPLICATIONS

The present application is a continuation of Ser. No. 09/292,164 filed Apr. 15, 1999, now U.S. Pat. No. 6,175,211 which claims benefit of copending U.S. provisional application Ser. No. 60/090,427, filed on Jun. 17, 1998.

FIELD OF THE INVENTION

This invention relates generally to a method and apparatus for charging rechargeable batteries.

BACKGROUND OF THE INVENTION

The battery packs for portable power tools, outdoor tools, and certain kitchen and domestic appliances may include rechargeable batteries, such as lithium, nickel cadmium and lead-acid batteries, so that they can be recharged rather than be replaced. Thereby a substantial cost saving is achieved. Some users of battery energized equipment may have need for batteries having substantially different capacities, and to properly charge batteries, different charging rates should be used to avoid damaging the batteries.

A substantial cost and space saving is realized by providing a universal charging apparatus for charging the different batteries which require different charging rates. Further, it would be advantageous for the charging apparatus to optimize the different charging rates for each battery, in order to avoid overcharging of the battery and/or minimize the charging time. In addition, it would be advantageous if the charging apparatus was adaptable to charge future battery technologies for which it may not have been programmed to charge.

SUMMARY OF THE INVENTION

In accordance with the present invention, a method for charging a rechargeable battery pack is proposed. The charging method comprises identifying battery capacity, determining sampling interval length according to the battery capacity, and implementing the determined sampling interval length.

Also disclosed herein is a method for charging batteries comprising identifying battery capacity, determining current-on period length in duty cycle according to the battery capacity, and implementing the determined current-on period length.

Further, disclosed herein is a battery charging apparatus comprising a charger for charging first and second batteries, where the first battery comprises a microprocessor. The charger further comprises at least one terminal for receiving a battery identification signal, so that the charger can distinguish between the first and second batteries.

Also disclosed herein is a battery/charger combination comprising a battery comprising first, second and third terminals, at least one cell disposed between the first and second terminals and a microprocessor disposed within the battery between the first and third terminals, a charger connected to the battery via the first, second and third terminals, wherein the microprocessor controls charging of the battery by sending instructions to the charger.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures, wherein like numerals designate like parts. All the teachings of the Saar U.S. Pat. Nos. 4,388,582 and 4,392,101 are hereby incorporated by reference into this specification.

Figure 1:
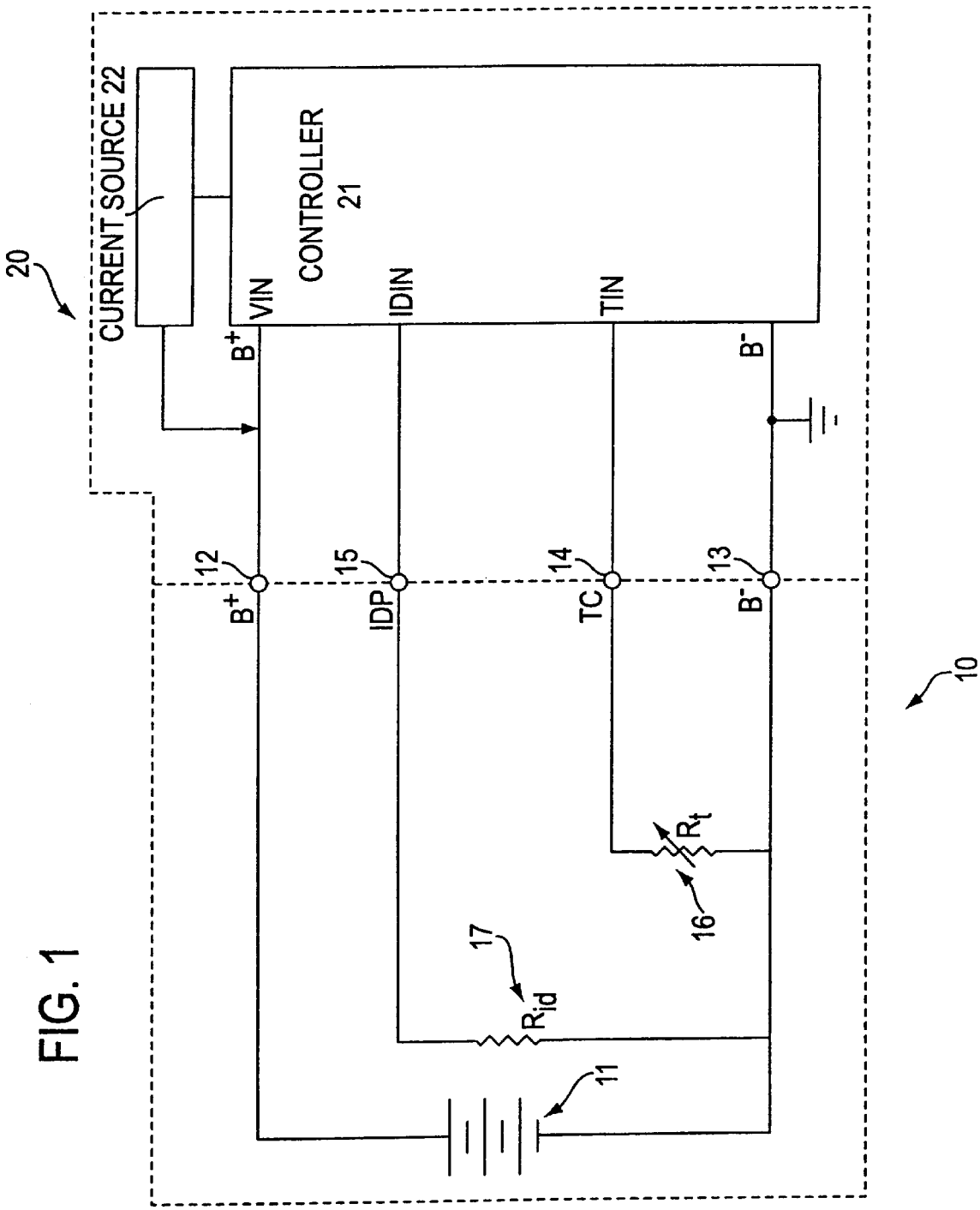
FIG. 1 is a circuit schematic diagram of a battery charger and a first battery according to the present invention.
Figure 2:
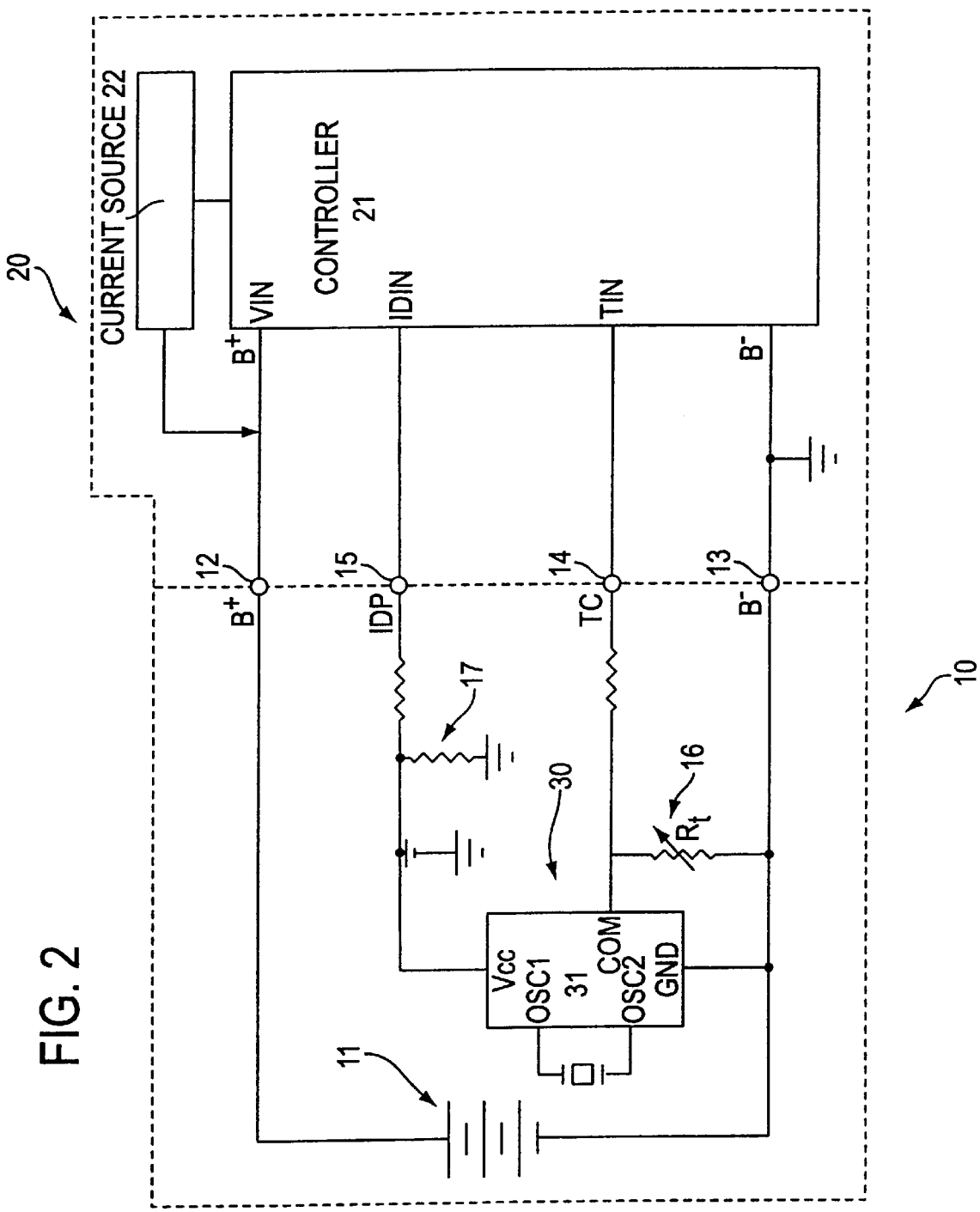
FIG. 2 is a circuit schematic diagram of a battery charger and a second battery according to the present invention.
Figure 3:
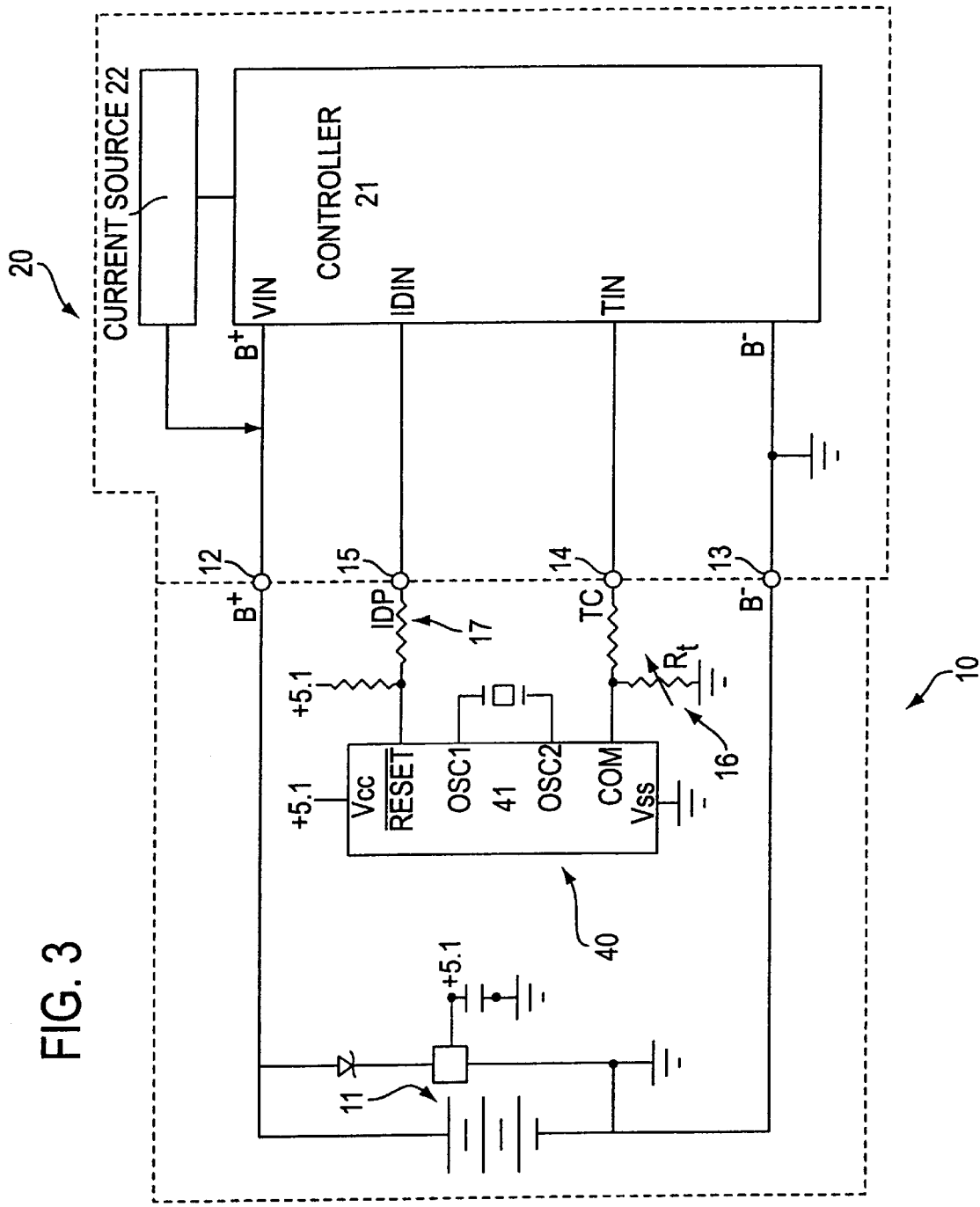
FIG. 3 is a circuit schematic diagram of a battery charger and a third battery according to the present invention.

Referring to FIGS. 1–3, a battery 10 is connected to a charger control circuit 20. Battery 10 comprises a plurality of battery cells 11 connected in series, which dictate the voltage and storage capacity for battery 10.

Battery 10 preferably includes four battery contacts: first battery contact 12, second battery contact 13, third battery contact 14 and fourth battery contact 15. Battery contact 12 is the B+ (positive) terminal for battery 10. Battery contact 13 is the B– or negative/common terminal. Battery contact 14 is the TC or temperature/communication terminal. Battery contact 15 is the DP or identification terminal. Battery contacts 12 and 13 receive the charging current sent from the charger control circuit 20 (preferably from current source 22, as discussed below) for charging the battery 10.

As shown in FIGS. 1–3, the battery cells 11 are coupled between the battery contacts 12 and 13. In addition, preferably coupled between battery contacts 13 and 14 is a temperature sensing device 16, such as a negative temperature co-efficient (NTC) resistor, or thermistor, $R_T$. The temperature sensing device 16 is preferably in close physical proximity to the cells 11 for monitoring of the battery temperature. Persons skilled in the art will recognize that other components, such as capacitors, etc., or circuits can be used to provide a signal representative of the battery temperature.

The charger control circuit 20 preferably comprises a controller 21, which may be a microprocessor. Controller 21 may include positive terminal B+ and negative terminal B–, which are coupled to battery 10 via battery contacts 12 and 13, respectively. The positive terminal may also act as an input VIN, in order for the controller 21 to detect the battery voltage. In addition, the controller 21 may include an input TIN, which is coupled to the temperature sensing device 16 via the TC battery contact 14. This allows the controller 21 to monitor the battery temperature. Controller 21 may control a current source 22 that provides current to battery 10. This current may be a fast charging current and/or an equalization current. Current source 22 may be integrated within controller 21. Preferably, current source 22 is designed to produce different fixed current outputs, rather than constantly variable outputs. Such current source 22 would be easy to design and inexpensive to manufacture.

Controller 21 may also have an input IDIN, which is coupled to the IDP terminal 15. This input is used in part by the controller 21 to identify the type and capacity of the battery to be charged. A battery identification device 17 may be connected to the IDP terminal to provide the identification information to controller 21. For example, in the battery 10 of FIG. 1, a battery identification device 17, in this case a resistor $R_{id}$, is connected between the IDP terminal and the negative terminal B−. The value of resistor $R_{id}$ (and thus the voltage drop across the resistor) is selected to indicate the type and capacity of battery. 10. Because of the voltage drop caused by resistor $R_{id}$, the controller 21 receives via IDIN input an analog signal which can be interpreted by the controller 21 to indicate the type and capacity of battery 10. Controller 21 can then modify any and/or all charging parameters, such as charging voltage, current and time, in order to minimize charging time and/or avoid overcharging.

For example, the range of voltage drop, or the range of ID values representative of the voltage drop range, can be mapped out and programmed into controller 21 so that, upon input of a signal via the IDIN input, the controller 21 can access the programmed values and determine the type and capacity of the battery. Accordingly, the controller 21 may be programmed to recognize that if the ID value ranges between 50 and 106, the battery 10 contains nickel-cadmium (NiCd) cells. Similarly, ID values between 112 and 160 may indicate that the battery 10 contains nickel metal hydride (NiMH) cells. Further, ID values between 180 and 230 may indicate that battery 10 contains fixed-voltage cell technologies, such as lead acid or lithium-ion, etc., which needs to be charged under the absolute voltage termination scheme Further, the controller may be programmed to recognize that if the ID value is, for example, 56, the battery 10 is a NiCd battery with 1.3 Amps/hour capacity. The ID values and their meaning may be stored in a table T. Controller 21 need only then to access table T to determine the type and capacity of the battery. Alternatively, controller 21 may derive the type and capacity of the battery by inputing the ID value into a predetermined equation, preferably of linear form.

Because future battery technologies may require different charging methods than those known in the prior art, the controller 21 can be programmed to recognize batteries incorporating such technologies in order to properly charge them. Preferably, controller 21 uses the signals received via the IDIN input to identify such batteries. Again, the ID value ranges may be can be mapped out and programmed into controller 21 (and/or table T) so that, upon input of a signal via the IDIN input, the controller 21 can access the programmed values and determine the required course of action. Alternatively, controller 21 may manipulate the ID value in order to determine the required course of action.

For example, if the ID values range between 50 and 230, the controller 21 will recognize that it already has the charging methods for these batteries and alter the corresponding charging method according to the type and capacity of the battery. If the ID values are below 50 and/or above 230, the controller 21 then will recognize that it does not have a preprogrammed charging method for this battery. The controller 21 will then stop the charging process or receive the appropriate charging information from the battery.

The ID value ranges can then be used to identify what kind of information the controller 21 will receive. For example, if the ID values are between 231 and 240, the controller 21 will recognize that the battery will send a list of commands for the controller 21 to execute and that, once the list is transmitted, the battery will not receive any further information from and/or send any further commands to controller 21. Preferably, such list of commands is sent through the TC contact 14. Similarly, if the ID values are below 50, the controller 21 will recognize that the battery is a "smart power-up" battery, as discussed below. Further, if the ID values are above 240, the controller 21 will recognize that the battery is a "full smart" battery, as discussed below.

Accordingly, the controller 21 is able to distinguish between a battery having a charging method pre-programmed in the controller 21 and a battery that will provide controller 21 with charging instructions. Preferably, the controller 21 is able to make this distinction through the use of a single input line (IDIN). Also, the controller 21 preferably detects the battery type and capacity through the use of the same input line.

FIGS. 2 and 3 illustrate two different types of smart batteries. In FIG. 2, in addition to the resistor $R_{id}$, battery 10 has an on-board controller 30 (preferably comprising a microprocessor 31). The controller 30 is preferably not normally powered-up and is dormant until the battery 10 is connected to charger 20. When controller 21 detects that battery 10 is a power-up smart battery (because of the D value obtained via the IDIN input), controller 21 preferably provides enough current and voltage through the IDP terminal to drive controller 30. Once controller 30 is powered, controller 21 relinquishes control of the charging process to controller 30. Controllers 21 and 30 preferably communicate via the TC terminal. Controller 30 can then control the charging of battery 10 by providing charger 20 with the steps required to charge the battery. Preferably, controller 30 actively controls the charging process. In other words, controller 30 issues commands to controller 21 to enableldisable current feed, etc. Controller 30 may also request information from controller 21, such as charger status, battery voltage and/or temperature, etc., which controller 30 can then use to carry out the charging process.

Similarly, in FIG. 3, battery 10 has an on-board controller 40 (preferably comprising a microprocessor 41). Unlike the controller 30, controller 40 is preferably normally powered-up at all times. Such controller 40 can then provide to or receive from the charger and/or device data, such as state-of-charge information. By being normally powered, controller 40 can also log and/or store any data as required. When controller 21 detects that battery 10 is a power-up smart battery (because of the ID value obtained via the IDIN input), controller 21 relinquishes control of the charging process to controller 40. Preferably, controllers 21 and 40 preferably communicate via the TC terminal. Controller 40 can then control the charging of battery 10 by providing charger 20 with the steps required to charge the battery. Preferably, controller 40 actively controls the charging process. In other words, controller 40 issues commands to controller 21 to enable/disable current feed, etc. Controller 40 may also request information from controller 21, such as charger status, battery voltage and/or temperature, etc., which controller 40 can then use to carry out the charging process.

As mentioned above, the preferred current source 22 provides fixed current outputs. Accordingly, battery packs of varying capacities may be charged with this fixed-current output power supply. Thus, it is preferable that the charging method is adaptable to properly charge the different batteries.

In particular, because overcharging may cause damage to the batteries, it is preferable to terminate the charging process based on voltage change rates or temperature change rates. These change rates however are dependent upon the length of sampling time interval. Usually, sampling time intervals are selected as a compromises between having a long time interval, accelerating the processing time but risking missing important events between samples, and a short time interval, slowing the processing time to process unimportant events or noise. In other words, if the sample time interval is too long, an event between samples may be missed and the battery may be overcharged. Conversely, if the sample time interval is too long, the charging process may be terminated prematurely without fully charging the battery.

It is thus proposed that sample time intervals be preferably C-rate-specific, otherwise the battery may be overcharged or undercharged. The C-rate is equal to the charger current output divided by the battery capacity. Accordingly, the C-rate when a four amp/hour battery is charged by a two amp charger is 0.5C. It has been found that a two amp charger may be used to charge a two amp/hour battery (at a 1C rate), the battery should reach fulll charge in one hour. The termination algorithm used to terminate the charging process may have, for example, a sample time interval of one minute. If a one amp/hour battery is placed in the same two amp charger (at a 2C rate), the battery should reach full charge in 0.5 hours. However, if the termination algorithm uses the same sample time interval of one minute, the sampling will be too slow and may cause overcharging of the battery. Similarly, if a four amp/hour battery is placed in the same two amp charger (at a 0.5C rate), the battery should reach full charge in two hours. However, if the termination algorithm uses the same sample time interval of one minute, the sampling will be too fast, causing early termination of the charging process and thus undercharging of the battery.

The controller 21 may calculate the desired sampling rate by identifying the battery type and capacity, using a prior scheme or the schemes proposed above, calculating the C-rate, and dividing a constant X by the C-rate to determine the length of sampling interval. Constant X preferably represents the length of a preferred sampling interval, which may be about 30 or 60 seconds. Persons skilled in the art will recognize that the selected length of the preferred sampling interval involves weighing different considerations, as discussed above.

The ID value may also be used to provide the proper sampling interval. For example, the controller 21 may access a table of stored values representative of different sampling intervals related to different batteries and use the ID value to select the value related to the proper sampling interval from the table. Alternatively, the controller 21 may input the ID value into an equation that would provide the proper sampling interval. This equation is preferably linear in nature, i.e., follows the form m(ID value)+b, where m and b are constants selected to provide proper one-to-one correspondence between the range of ID values and the range of sampling intervals.

Once the proper sampling interval is selected, it is preferable that the controller 21 implement the proper sampling interval automatically. The controller 21 can then properly calculate meaningful voltage and/or temperature change rates, and terminate according to methods well known in the art.

In addition, controller 21 may terminate charging after a predetermined number of sampling intervals has elapsed. The predetermined number of sampling intervals may range between 30 and 140, where the preferred number of sampling intervals is 120.

Once the controller 21 terminates charging, the current source 22 may provide a maintenance and/or equalization current to the battery.

Such scheme is especially useful for cell chemistries, such as NiCd, that allow the battery to be charged over wide range of charge rates, allowing the battery to be charged as quickly as possible. This scheme may also simplify the code for controller 21, if the different voltage curves for the different capacities vary only along the x-axis, i.e., time, rather than on the y-axis, i.e., voltage or temperature. This scheme may also be used for cell chemistries, such as NiMH, that cannot accept charging current beyond capacity.

Another scheme may be used for cell chemistries, such as NiMH, that cannot accept charging current beyond capacity. In other words, if a battery can only accept one amp, such battery could be damaged if it was inserted into a two amp charger. Such a problem may be avoided if the controller 21 repeatedly switches on and off the current source 22, preferably creating a duty cycle where the current is on for a specific period of time and off for a specific period of time.

Assuming that the length of the duty cycle is fixed, the controller 21 need only calculate the length of the "current-on" period, as the length of the "current-off" period will be equal to the length of the duty cycle minus the length of the current-on period. The controller 21 may calculate the desired sampling rate by identifying the battery type and capacity, using a prior scheme or the schemes proposed above, calculating the C-rate, and multiplying a constant Y by the C-rate to determine the current-on period length. Constant Y preferably represents the length of a duty cycle, which may be about 30 or 60 seconds. Persons skilled in the art will recognize that the selected length of the duty cycle involves weighing different considerations, as known in the art. The ID value may also be used to provide the proper current-on period length. For example, the controller 21 may access a table of stored values representative of different current sampling intervals related to different batteries and use the ID value to select the value related to the proper current-on period length from the table. Alternatively, the controller 21 may input the ID value into an equation that would provide the proper current-on period length This equation is preferably linear in nature, i.e., follows the form n(ID value)+c, where n and c are constants selected to provide proper one-to-one correspondence between the range of ID values and the range of current-on period lengths.

Once the proper current-on period length is selected, it is preferable that the controller 21 implement the proper current-on period length automatically. The controller 21 can then properly calculate meaningful voltage and/or temperature change rates, and terminate according to methods well known in the art.

In addition, controller 21 may terminate charging after a predetermined number of sampling intervals has elapsed. The predetermined number of sampling intervals may range between 30 and 140, where the preferred number of sampling intervals is 120.

Once the controller 21 terminates charging, the current source 22 may provide a maintenance and/or equalization current to the battery.

Preferably the sampling interval length coincides with the duty cycle length. It is also preferable that the instant when the battery conditions are sampled be coincident or near coincident with the end of the duty cycle.

If the battery capacity is larger than the current output of the charger, it is preferable to increase the sampling interval, while continuously sending current to the battery. Preferably the sampling interval is selected according to the method described above.

Persons skilled in the art may recognize other alternatives or additions to the means or steps disclosed herein. However, all these additions and/or alterations are considered to be equivalents of the present invention.

What is claimed is:

1. A method comprising:

providing a battery and a charger for charging the battery;

identifying battery capacity of the battery;

calculating C-rate; and determining sampling interval length according to the C-rate.

2. The method of claim 1, wherein the C-rate is calculated by dividing current output of the charger by the battery capacity.

3. The method of claim 1, wherein the sampling interval length is determined by dividing a predetermined sampling interval length by the C-rate.

4. The method of claim 3, wherein the predetermined sampling interval length is between about 30 and 60 seconds.

5. The method of claim 1, further comprising terminating battery charging after a predetermined number of sampling intervals has occurred.

6. The method of claim 5, wherein the predetermined number is between 30 and 140.

7. A method comprising:

providing a battery comprising a battery identification device having a value, and a charger for charging the battery; and selecting sampling interval length according to the value of the battery identification device.

8. The method of claim 7, wherein the sampling interval length is selected by inputting the value into an equation.

9. The method of claim 7, wherein the sampling interval length is selected by using the value to access a table.

10. The method of claim 7, further comprising terminating battery charging after a predetermined number of sampling intervals has occurred.

11. The method of claim 10, wherein the predetermined number is between 30 and 140.

12. A method comprising:

providing a battery and a charger for charging the battery;

identifying battery capacity of the battery;

calculating C-rate; and determining current-on period length according to the C-rate.

13. The method of claim 12, wherein the C-rate is calculated by dividing current output of the charger by the battery capacity.

14. The method of claim 12, wherein the current-on period length is determined by multiplying a predetermined length by the C-rate.

15. The method of claim 14, wherein the predetermined length is between about 30 and 60 seconds.

16. The method of claim 12, further comprising terminating battery charging after a predetermined number of current-on periods has occurred.

17. The method of claim 16, wherein the predetermined number is between 30 and 140.

18. A method comprising:

providing a battery comprising a battery identification device having a value, and a charger for charging the battery; and selecting current-on period length according to the value of the battery identification device.

19. The method of claim 18, wherein the current-on period length is selected by inputting the value into an equation.

20. The method of claim 18, wherein the current-on period length is selected by using the value to access a table.

21. The method of claim 18, further comprising terminating battery charging after a predetermined number of current-on periods has occurred.

22. The method of claim 21, wherein the predetermined number is between 30 and 140.

* * * * *